United States Patent
Cheng

(10) Patent No.: US 11,669,173 B2
(45) Date of Patent: Jun. 6, 2023

(54) DIRECT THREE-DIMENSIONAL POINTING USING LIGHT TRACKING AND RELATIVE POSITION DETECTION

(71) Applicant: AMCHAEL VISUAL TECHNOLOGY CORPORATION, Hsinchu (TW)

(72) Inventor: Kai Michael Cheng, Lexington, KY (US)

(73) Assignee: AmchaelVisual Technology, LLC, Lexington, KY (US)

( * ) Notice: Subject to any disclaimer, the term of this patent is extended or adjusted under 35 U.S.C. 154(b) by 297 days.

(21) Appl. No.: 17/122,812

(22) Filed: Dec. 15, 2020

(65) Prior Publication Data

US 2021/0208699 A1   Jul. 8, 2021

Related U.S. Application Data

(63) Continuation of application No. 16/538,432, filed on Aug. 12, 2019, now abandoned, which is a continuation of application No. 14/573,008, filed on Dec. 17, 2014, now abandoned.

(60) Provisional application No. 62/028,335, filed on Jul. 24, 2014.

(51) Int. Cl.
*G06F 3/0346* (2013.01)
*G06F 3/03* (2006.01)
*G06F 3/0354* (2013.01)

(52) U.S. Cl.
CPC .......... *G06F 3/0346* (2013.01); *G06F 3/0304* (2013.01); *G06F 3/0308* (2013.01); *G06F 3/03542* (2013.01)

(58) Field of Classification Search
CPC .... G06F 3/0346; G06F 3/0304; G06F 3/0308; G06F 3/03542
See application file for complete search history.

(56) References Cited

U.S. PATENT DOCUMENTS

| | | | |
|---|---|---|---|
| 2011/0163950 A1* | 7/2011 | Ye | G06F 3/0346 345/157 |
| 2013/0023341 A1* | 1/2013 | Yamanouchi | A63F 13/428 463/31 |
| 2014/0313132 A1* | 10/2014 | Chen | G06F 3/03543 345/166 |

* cited by examiner

*Primary Examiner* — Rodney Amadiz
(74) *Attorney, Agent, or Firm* — Patrick M. Torre; Stites & Harbison PLLC

(57) ABSTRACT

A computing system for direct three-dimensional pointing includes at least one computing device, and a pointing/input device including at least one light source and a motion sensor module for determining absolute and relative displacement of the pointing/input device. At least one imaging device is configured for capturing a plurality of image frames each including a view of the light source as the pointing/input device is held and/or moved in a three-dimensional space. Two or more imaging devices may be provided. A computer program product calculates at least a position and/or a motion of the light source in three-dimensional space from the plurality of sequential image frames and from the pointing/input device absolute and relative displacement information, and renders on the graphical user interface a visual indicator corresponding to the calculated position and/or the motion of the light source. Methods for direct three-dimensional pointing and command input are described also.

18 Claims, 15 Drawing Sheets

DIRECT THREE-DIMENSIONAL POINTING USING LIGHT TRACKING AND RELATIVE POSITION DETECTION

This continuation patent application claims the benefit of priority in U.S. Continuation patent application Ser. No. 16/538,432 filed on Aug. 12, 2019, which in turn claims priority to U.S. Utility patent application Ser. No. 14/573,008 filed on Dec. 17, 2014 which claims priority to U.S. Provisional Patent Application Ser. No. 62/028,335 filed on Jul. 24, 2014, the entirety of the disclosures of which are incorporated herein by reference.

TECHNICAL FIELD

The present disclosure relates to human-computer interaction systems. More specifically, this disclosure pertains to methods and systems related to three-dimensional pointing, using a system integrated for both absolute position detection and relative position detection. Embodiments of a pointing/input device useful in the methods and systems are disclosed also.

BACKGROUND OF THE INVENTION

As shown in FIG. 1, for three-dimensional (3D) pointing on a two-dimensional (2D) screen, a user O uses a handheld 3D pointing device 2 aimed at a point on a display surface 3 of a 2D image display device 4. In systems wherein the pointing device 2 emits a beam of light (see broken line), the point is the location where the light beam contacts the display surface. Example pointing devices 2 include a computer mouse, a video game console, or a so-called "smart" TV remote. The display surface 3 may be the monitor screen of a computing device, a video game console, etc.

In systems where a pointer such as a cursor, cross-hair, or other indicator is always displayed at the point of the display surface where the pointing device 2 is aimed, the pointing device 2 is referred to as a direct or absolute pointing device and the process is referred to as a direct or absolute pointing process. On the other hand, in systems where the pointer is not necessarily displayed at the point of the display surface where the pointing device 2 is aimed, the pointing device 2 is referred to as a relative pointing device and the process is referred to as a relative pointing process. These concepts are depicted in more detail in FIGS. 2 and 3.

FIG. 2A depicts an initial status of a relative pointing process. An aimed point 20 and a displayed point 21 are set by the system to coincide. Once the aimed point 20 of the pointing device 2 leaves a boundary of the display surface (see FIG. 2B), the displayed point 21 does not follow but rather remains at a point X which represents the spot where the aimed point 20 departed from the display surface boundary. In such systems, the accumulated displacement travelled by the pointing device 2 outside the boundary of the display surface is recorded and added to a final location of the displayed point 21 when aimed point 20 returns within the boundary of the display surface. Therefore, as shown in FIG. 2C, the displayed point 21 is different from the aimed point 20 after this process. This significantly departs from the cognition and intuition of an operator. What an operator needs is a pointing device that can always do direct pointing, i.e., the displayed point 21 always coincides with the aimed point 20, even when the pointing device 2 leaves the display surface 3 and reenters the display surface 3 again, as shown in FIG. 3C.

However, almost all modern 3D pointing devices and 3D remotes such as for smart televisions are relative pointing devices. This is because such devices use a motion sensor module to provide information for determining the location of a pointer on the device screen, and the information provided by the motion sensors is relative information. As an example, a motion sensor module may include a G-sensor, a gyroscope sensor, and a magnetic field sensor. These sensors provide rotation information (azimuth, pitch, and roll) and acceleration/velocity information (linear acceleration, angular velocity) relative to the previous location of the pointing device 2. A number of compensation techniques are known to correct a difference between an aimed point 20 and a displayed point 21 of a pointing device 2. However, because the location of the pointing device 2 relative to the display surface is not known, such compensation techniques are of reduced effectiveness.

In addition to a motion sensor module, it is known to include an imaging device in a pointing device to provide additional information for determination of an aimed point. As shown in FIG. 4, an imaging device such as an infrared (IR) camera 32 may be included in the pointing device 2 whereby images of light emitted by light sources 34 in a sensor bar 36 are used together with information provided by a motion sensor module 30 to precisely identify an aimed point 38 of the pointing device 2 and to provide a pointer or other icon coinciding with that aimed point 38 on a display surface 40. This scheme is used in a number of devices, such as Nintendo's® Wii®, Philips'® uWand, and certain technology of Apple®.

The system as depicted in FIG. 4 has certain disadvantages. Because the imaging device 32 is installed in the pointing device 2, the operator must ensure that the pointing device 2 constantly faces the sensor bar 36 so that the imaging device can capture images of the sensor bar 36. In turn, because computation to determine a location of aimed point 38 is done by modules contained in the pointing device 2, the system cannot take advantage of the full computing power of a console 42. If responsibility for such computation is transferred to console 42, then the operation of the pointing device 2 would not be convenient for users if the connection between the pointing device 2 and console 42 is wired. Alternatively, in a wireless configuration high bandwidth wireless transmission is required between the pointing device 2 and the console 42. Moreover, the system cannot take advantage of any imaging capability of display surface 40 (for example, an integrated or add-on web cam). Still further, improvements in the imaging capability of a system such as that shown in FIG. 4 are not possible due to space considerations, since typically adding additional imaging devices to pointing device 2 is not possible due to space considerations, i.e. because the pointing device 2 simply cannot accommodate additional imagers. The only solution is to attempt to improve resolution of the imaging device included in pointing device 2, which may be undesirable due to cost considerations and the limitations of resolution of even the most effective imaging devices sized to fit in or on a pointing device 2 suitable for hand-held operation by a user.

There is accordingly a need identified in the art for direct pointing systems that can utilize the computing capabilities of a console rather than relying only on the computing power provided by a pointing device, and also which can utilize imaging devices incorporated into or added-on to a display surface such as a computing device screen, smart TV screen, etc. The ability to interface with multiple imaging devices would also be desirable. Also, such systems would provide that a displayed point of a pointing device on a display surface always coincides with an aimed point of the pointing device, even when that aimed point departs from a boundary of a display surface and then reenters that boundary.

SUMMARY OF THE INVENTION

To solve the foregoing problems and address the identified need in the art, the present disclosure provides a direct pointing system that can take advantage of the computing power of the console and the imaging capability of a display surface equipped with one or more imaging devices. The described system can be operated with more flexibility, and can still provide good direct pointing results.

In one aspect, the present disclosure describes a computing system for direct three-dimensional pointing and command input. The system includes at least one computing device and a graphical user interface. A pointing/input device is provided including at least one light source and a motion sensor module. The motion sensor module provides information regarding an absolute and a relative displacement of the pointing/input device to the at least one computing device. At least one imaging device is operably linked to the computing device processor, and may be associated with the graphical user interface. In embodiments, a plurality of imaging devices are associated with the graphical user interface and operably linked to the computing device processor.

The imaging device is configured for capturing a plurality of image frames each including a view of the at least one light source as the pointing/input device is held and/or moved in a three-dimensional space and within a field of view of the at least one imaging device. A one non-transitory computer program product operable on the computing device processor includes executable instructions for calculating at least a position and/or a motion of the at least one light source in three-dimensional space from the plurality of sequential image frames and from the pointing/input device absolute and relative displacement information, and for rendering on the graphical user interface a visual indicator corresponding to the calculated position and/or the motion of the at least one light source.

In embodiments, the computer program product includes executable instructions for determining a position and/or a motion of the at least one light source in three-dimensional space by determining a current position of the at least one light source in a captured image frame and determining a prior position of the at least one light source in at least one prior captured image frame. A relative displacement of the pointing/input device is determined by the computing device processor from information provided by the motion sensor module. Next a location of the at least one light source in three-dimensional space is calculated from the determined relative displacement information and the determined at least one light source current and prior positions. A pointing direction of the pointing/input device defining an axis of the pointing/input device is determined from information provided by the motion sensor module. From the calculated three-dimensional location of the at least one light source and the determined pointing direction of the pointing/input device provided by the motion sensor module, an intersection point of the axis of the pointing/input device and the graphical user interface is calculated by the computing device processor and displayed as a visual indicator (an icon, cross-hairs, a pointer, etc.) in the graphical user interface. Movements of the pointing/input device may be interpreted as particular command inputs by the computing device processor.

In embodiments, the computer program product includes executable instructions for calculating a location of the at least one light source in three-dimensional space from the determined current and prior positions of the at least one light source by identifying a first region corresponding to a position of the at least one light source in the captured image frame and a second region corresponding to a position of the at least one light source in the at least one prior captured image frame. From those identified regions, a first position of the at least one light source in the captured image frame and a second position of the at least one light source in the at least one prior captured image frame are calculated. Then, a displacement vector of the pointing/input device caused by translating the at least one light source between the first region and the second region is calculated. This process is repeated in succeeding sets of current and prior captured image frames.

In another aspect, a method for tracking a pointing/input device is provided using the light source position and pointing/input device absolute and relative displacement information obtained from the system as described above.

These and other embodiments, aspects, advantages, and features will be set forth in the description which follows, and in part will become apparent to those of ordinary skill in the art by reference to the following description and referenced drawings or by practice of the invention. The aspects, advantages, and features are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

In the following detailed description of the illustrated embodiments, reference is made to the accompanying drawings that form a part hereof, and in which is shown by way of illustration specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present disclosure.

Figure 1:
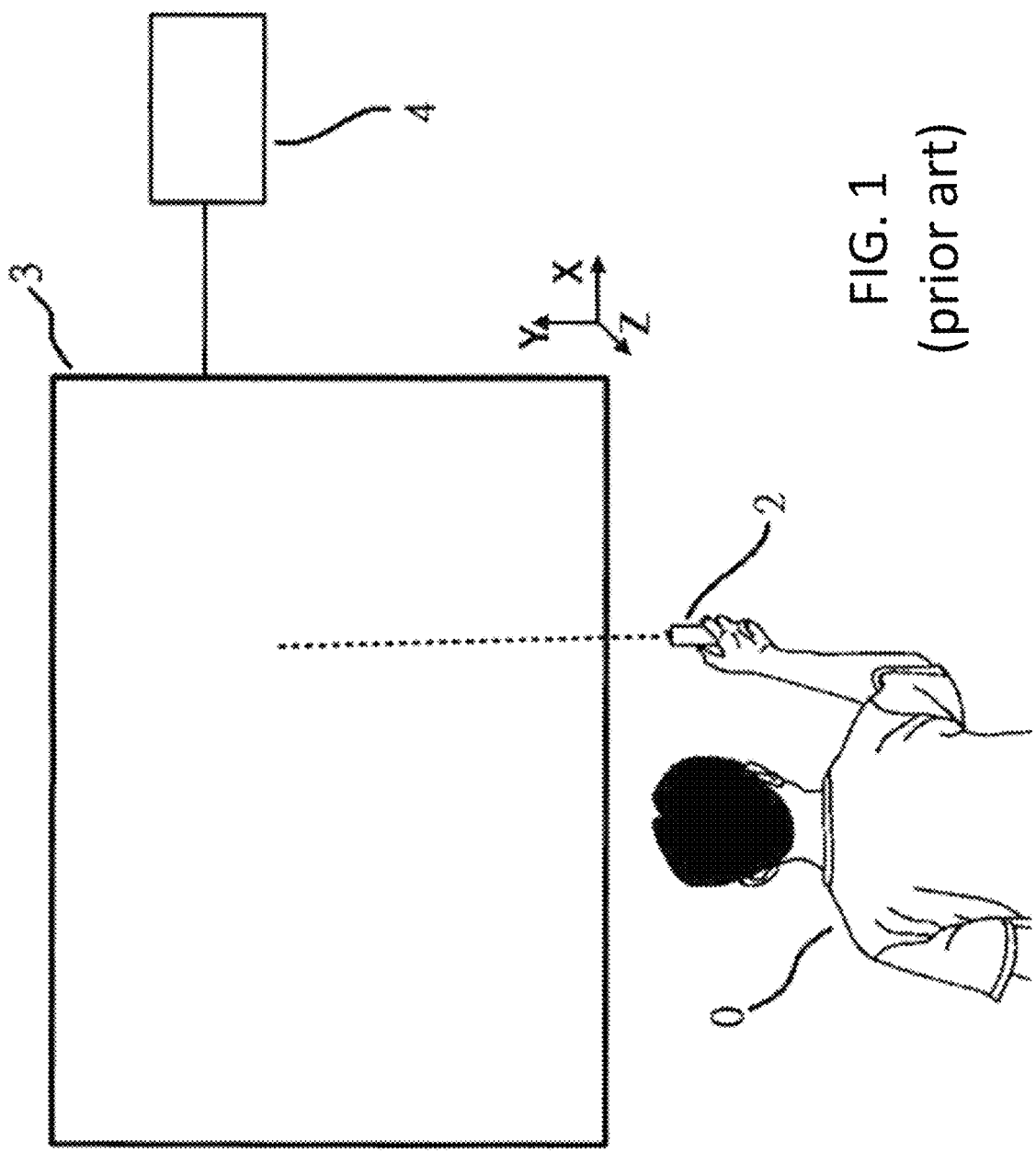
FIG. 1 depicts a user using a prior art system for three-dimensional pointing using a handheld pointer.
Figure 2:
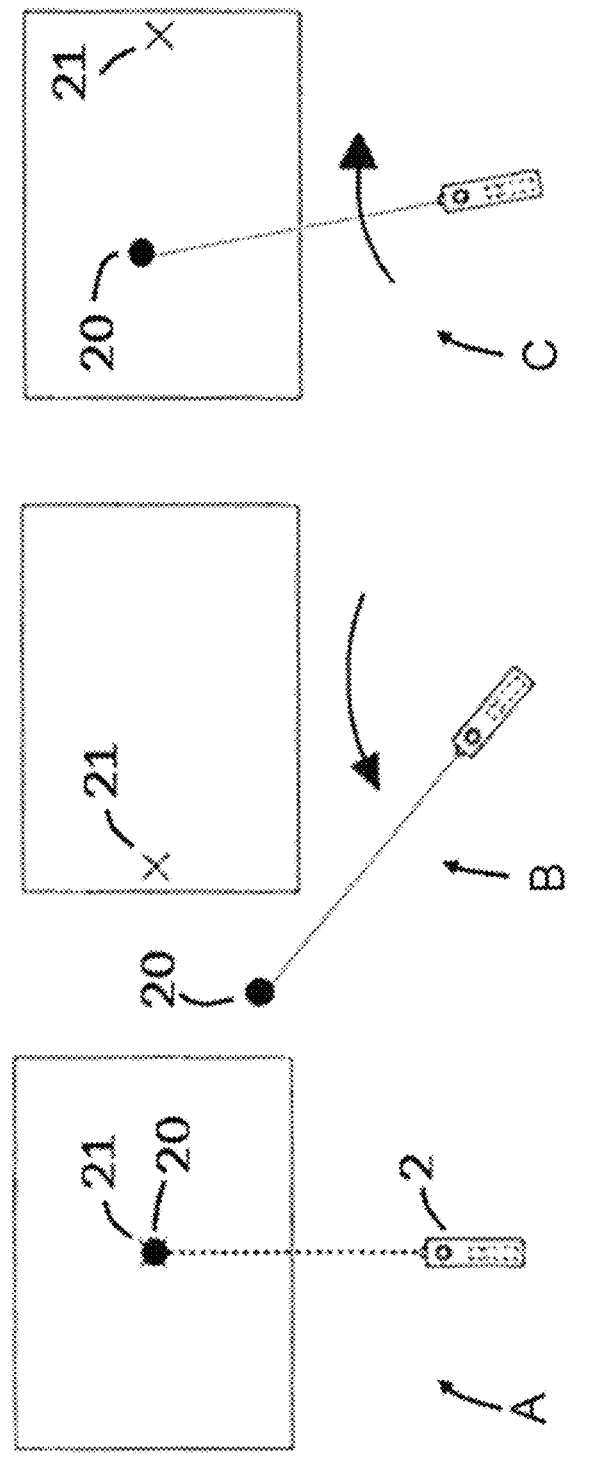
FIG. 2 illustrates a prior art system and method for a relative pointing process, showing an aimed point and a displayed point coinciding initially (FIG. 2A), the aimed point leaving the display surface and the displayed point remaining (FIG. 2B), and the aimed point returning to the display surface at a different region from the displayed point (FIG. 2C)
Figure 3:
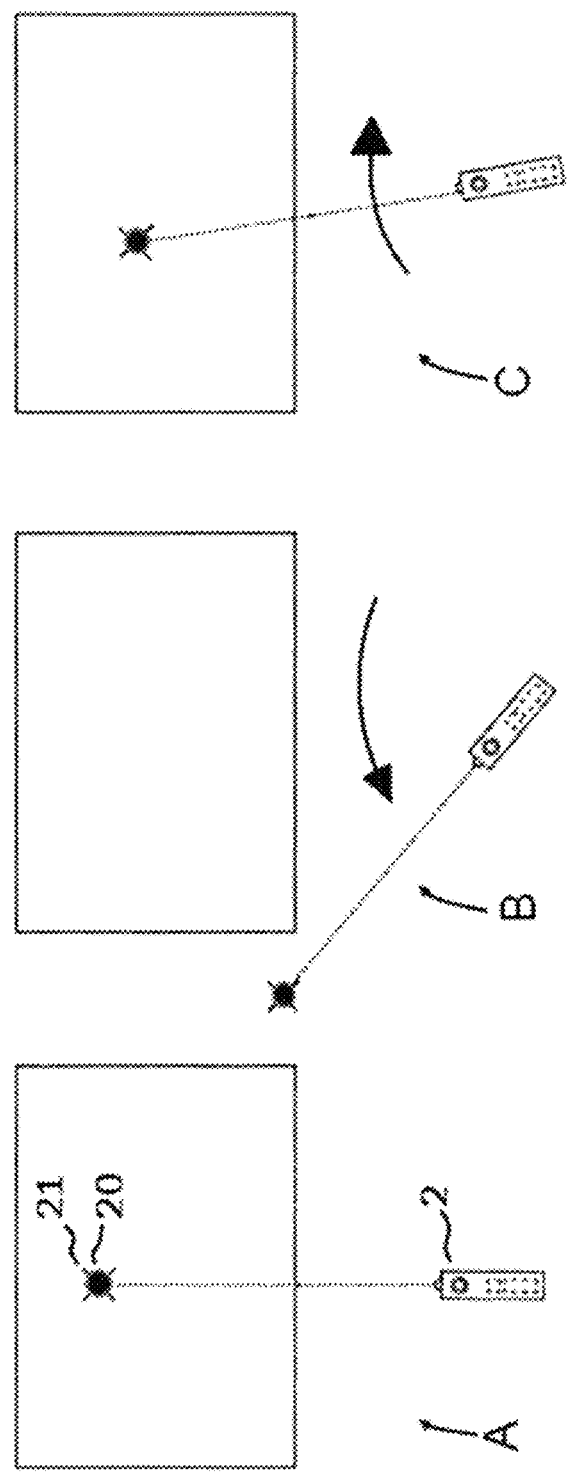
FIG. 3 illustrates a prior art system and method for a direct pointing process, showing an aimed point and a displayed point coinciding initially (FIG. 3A), the aimed point leaving the display surface (FIG. 3B), and the aimed point returning to the display surface (FIG. 3C)
Figure 4:
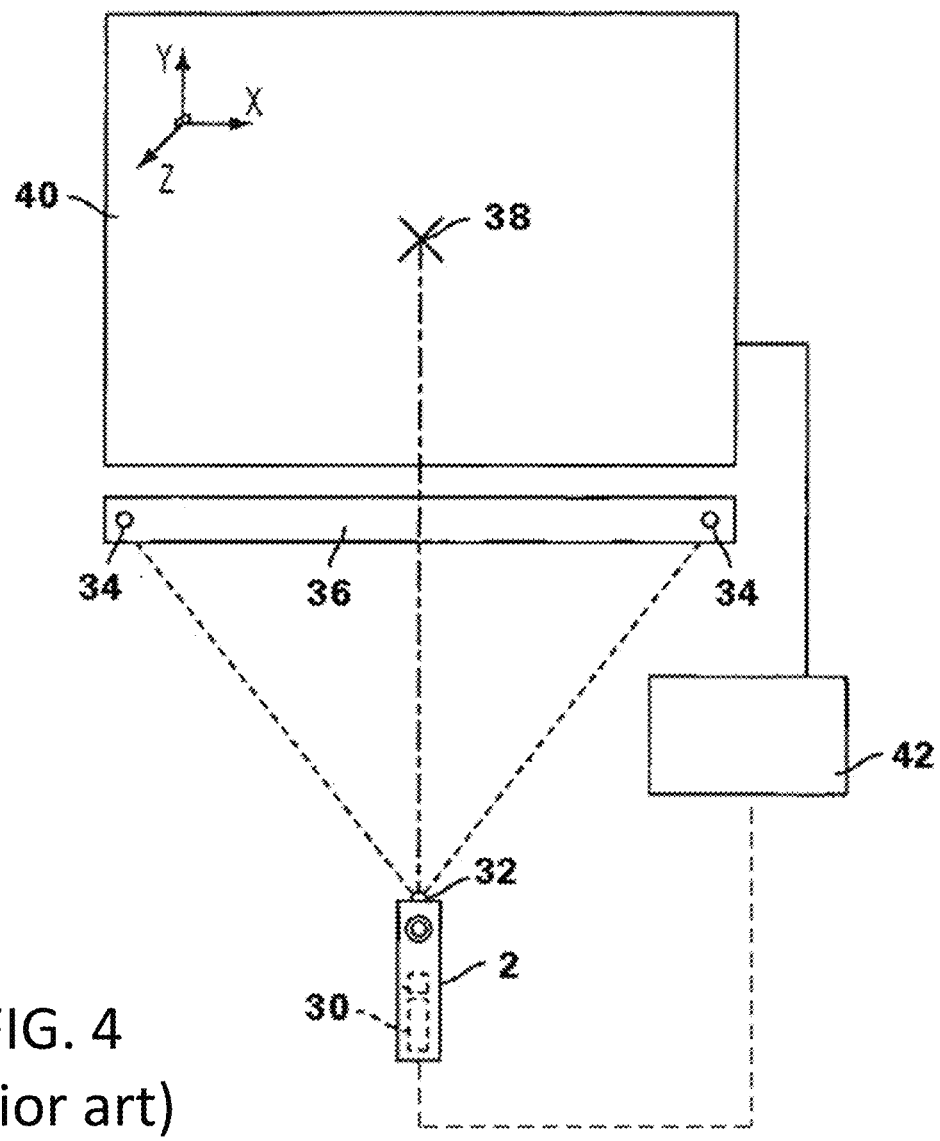
FIG. 4 shows a prior art system for three-dimensional pointing, including a pointer having an integrated IR camera and a display surface associated with a sensor bar.
Figure 5:
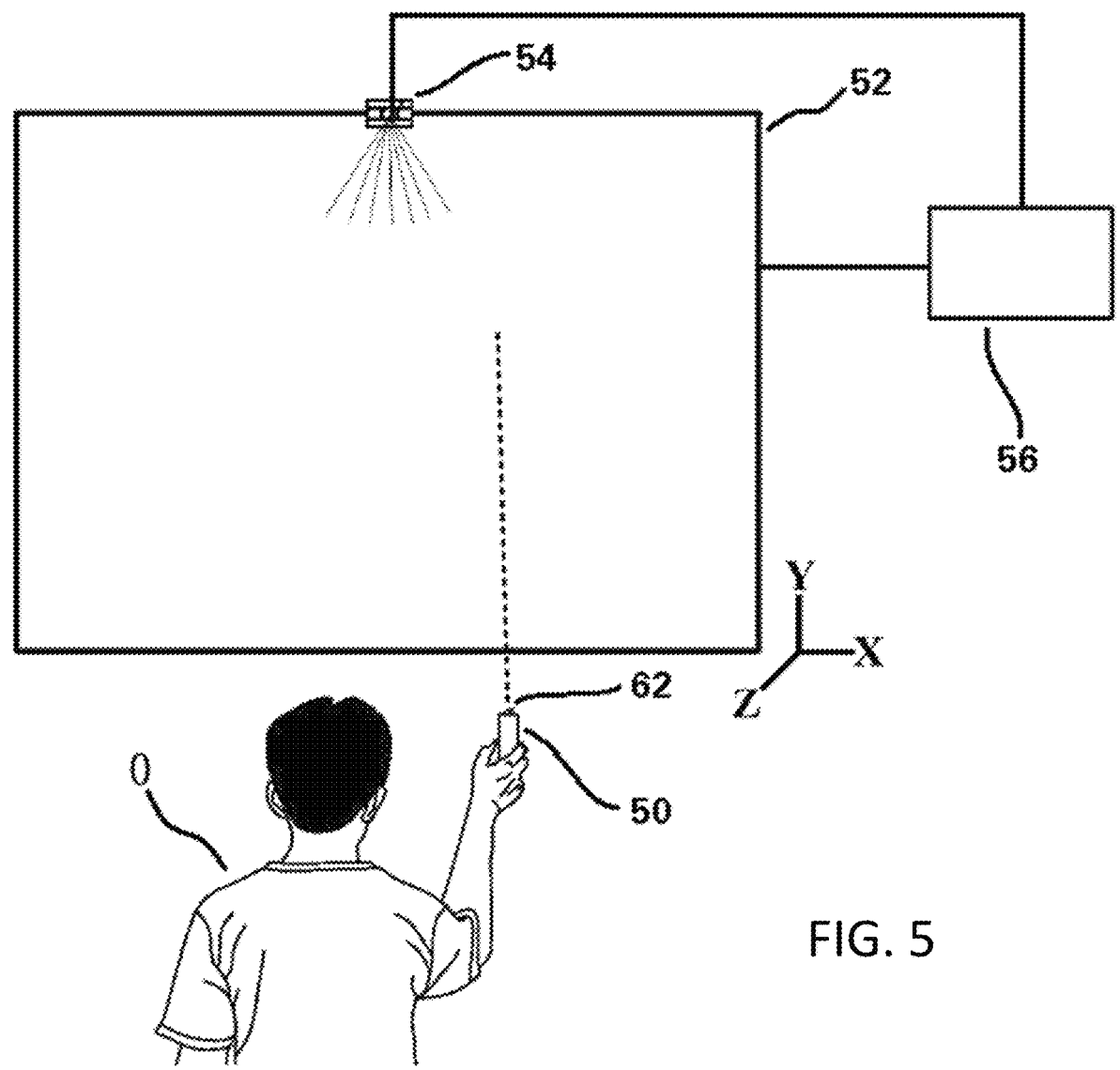
FIG. 5 shows a system for three-dimensional pointing and command input according to the present disclosure, including a pointing/input device and a display surface including an imaging device.

At a high level, the present disclosure provides systems and methods for obtaining an absolute location of a visual marker, including a pointer such as a cursor, cross-hair, etc. on an image display apparatus using integrated absolute and relative devices. With reference to FIG. 5, the system includes a pointing/input device 50, an image display device 52, at least one image capture device 54, and a computing device 56. Without intending any limitation, example image display devices include such devices as a projector, a television screen, a graphical user interface such as a computer monitor (which may be 2D or 3D), and the like. Example image capture devices include webcams, etc. example computing devices include computing devices (personal computers, smartphones, tablets, laptops, etc.), gaming consoles, and the like. It will be appreciated that a transferring protocol is established between the image capture device 54 and the computing device 56. Such protocols may be wired or wireless as is known in the art.

In use, the pointing/input device 50 functions substantially in the manner of a laser pointer, except it moves an indicator such as a cursor, cross-hairs, etc. instead of a red dot. When an operator 0 uses the pointing device 50 to aim at a point (e.g., point 70 in FIG. 5) on the image display apparatus 52, a cursor will appear at the location pointed to by the pointing device 50. This cursor will move when the pointing device 50 changes its direction, but always to a location on the image display apparatus 52 at which the pointing device 50 is aimed.

The pointing/input device 50 of this disclosure can also be used as an input device, substantially similar in function to a computer mouse or other such input device. The position specified by the pointing/input device 50 on the image display apparatus 52 on an x-y coordinate system defined on the image display apparatus 52 is computed, and (x, y) coordinates of that specified position can be used to identify an item or icon displayed on the image display apparatus 52. Therefore, by manipulating the pointing/input device 50, a user can interact with most operating systems (e.g., Android® or Microsoft® Windows®), for example selecting files, programs, or actions from lists, groups of icons, etc., and can freely move files, programs, etc., issue commands or perform specific actions, such as those used in a drawing program.

Figure 6:
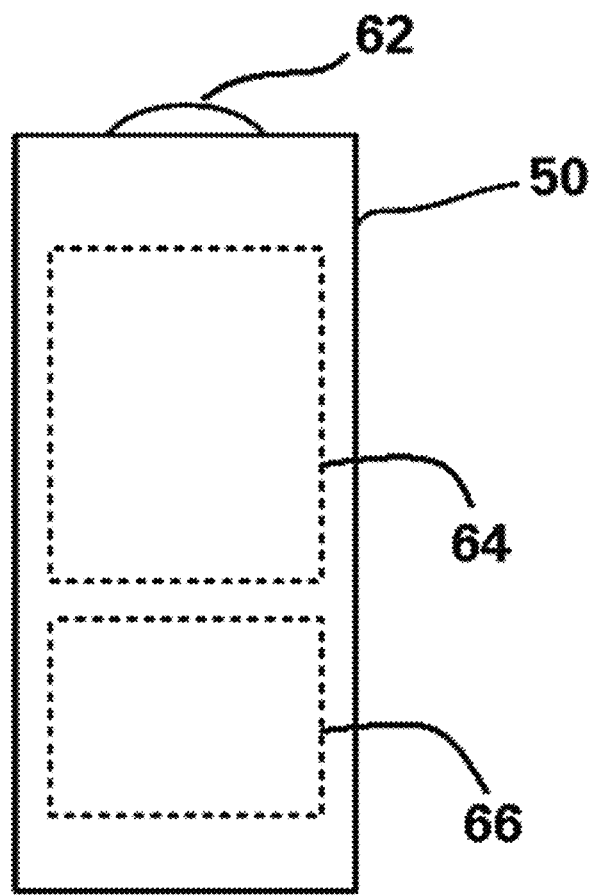
FIG. 6 depicts a pointing/input device according to the present disclosure.

At least three components are embedded in the pointing/input device 50 (FIG. 6): a light source 62, a control panel 64, and a motion sensor module 66. In an embodiment, the light source 62 is an LED light, but other suitable light sources are contemplated. The control panel 64 consists of multiple buttons, which can provide direct functionality, such as the number keys, arrow keys, enter button, power button, etc. The system uses images of the light source 62 taken by the image capture device 54 and information provided by the motion sensor module 66 to identify a location pointed to by the pointing/input device 50 as will be described below. An absolute position of an icon such as a cursor or a cross-hair, representing an aimed point of the pointing/input device 50 on the image display apparatus 52 can then be precisely computed.

The motion sensor module 66 consists of a set of motion detecting sensors to provide absolute and relative motion information of the device (e.g., acceleration, rotations, etc) to the computing device 56 in real time through some wireless channel. The set of motion detecting sensors contained in the motion sensor module 66 can include a G-sensor, a gyroscope sensor, a magnetic field sensor, and others.

The image capture device 54 functions as a viewing device for the computing device 42, taking images of the scene in front of the image display apparatus 52 at a fixed frame rate per second. Those images are sent to the computing device 56 for subsequent processing. Use of any conventional image capture device/imaging device 54, including single lens imaging devices such as a standard webcams, is contemplated. In an embodiment, an image capture device 54 having a frame rate that is at least 30 frames per second is contemplated.

Figure 7:
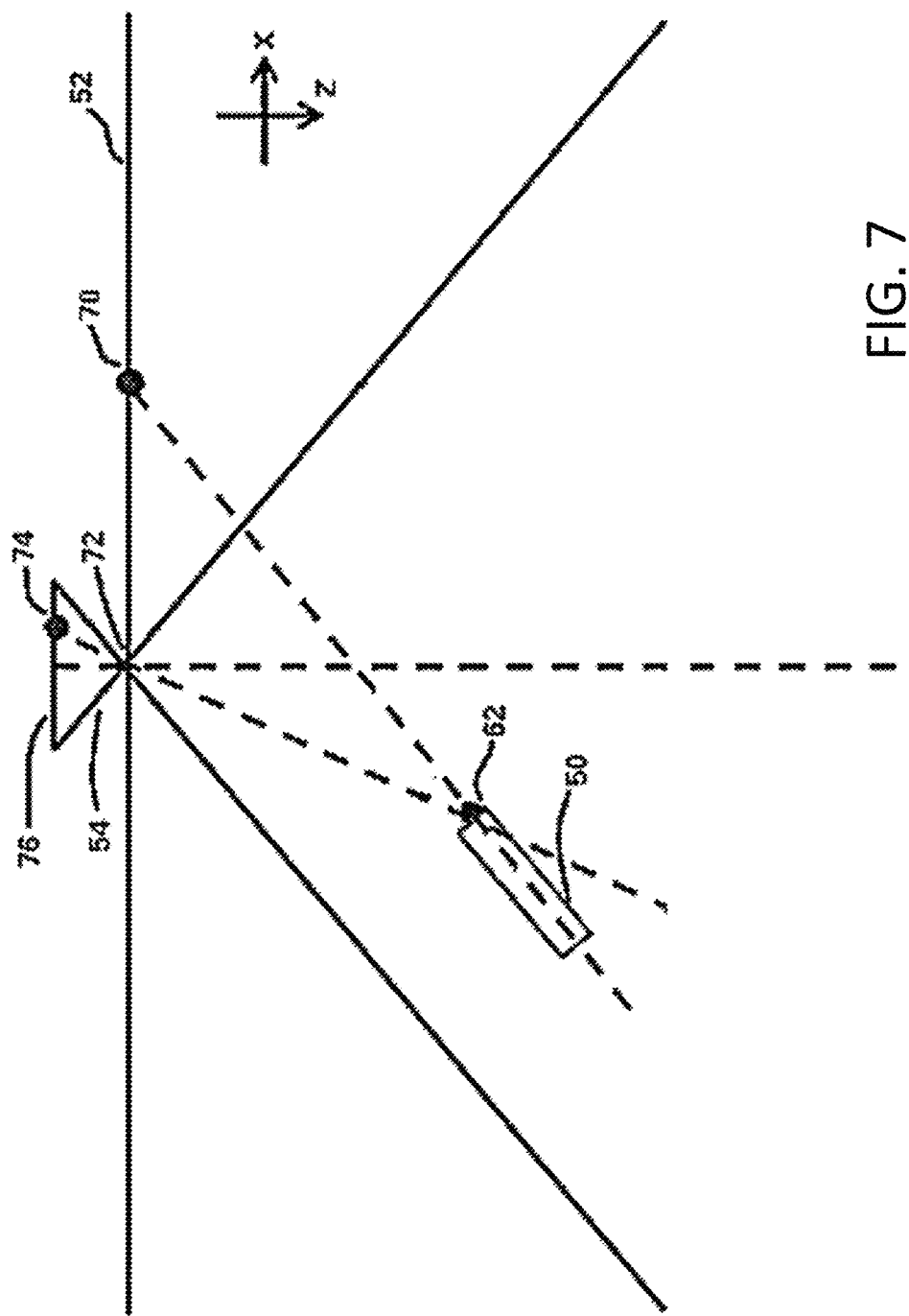
FIG. 7 illustrates computation of a displayed point on a display surface according to the present disclosure.

The computing device 56 processor provides the functionality of light source location identification that will identify the location of the light source 62 in sequential images sent by the image capture device 54, and of computation of the point that the pointing/input device 50 points to on the image display apparatus 52 (see FIG. 7 for another illustration, which is a projection of the scene in the xz-plane). When the computing device 56 receives an image from the image capture device 54, it first identifies the location of the light source 62 in the image using light source tracking software. It next uses the identified location of the light source 62 in a previous image sent by the image capture device 54, and relative displacement information sent by the motion sensor module 66 of the pointing device 50 to compute the location of the light source 62 in 3D space. Finally it uses the 3D location of the light source 62 and orientation angle information sent by the motion sensor module 66 to compute an intersection point 70 of an axis of the pointing/input device 50 defining an aimed direction of the pointing/input device 50 with the image display apparatus 52 (see FIG. 7). This is the point on the image display apparatus 52 that the pointing/input device 50 points to.

Therefore, by displaying a cursor or other icon at that point of the image display apparatus 52, the job of performing direct pointing is done.

Figure 8:
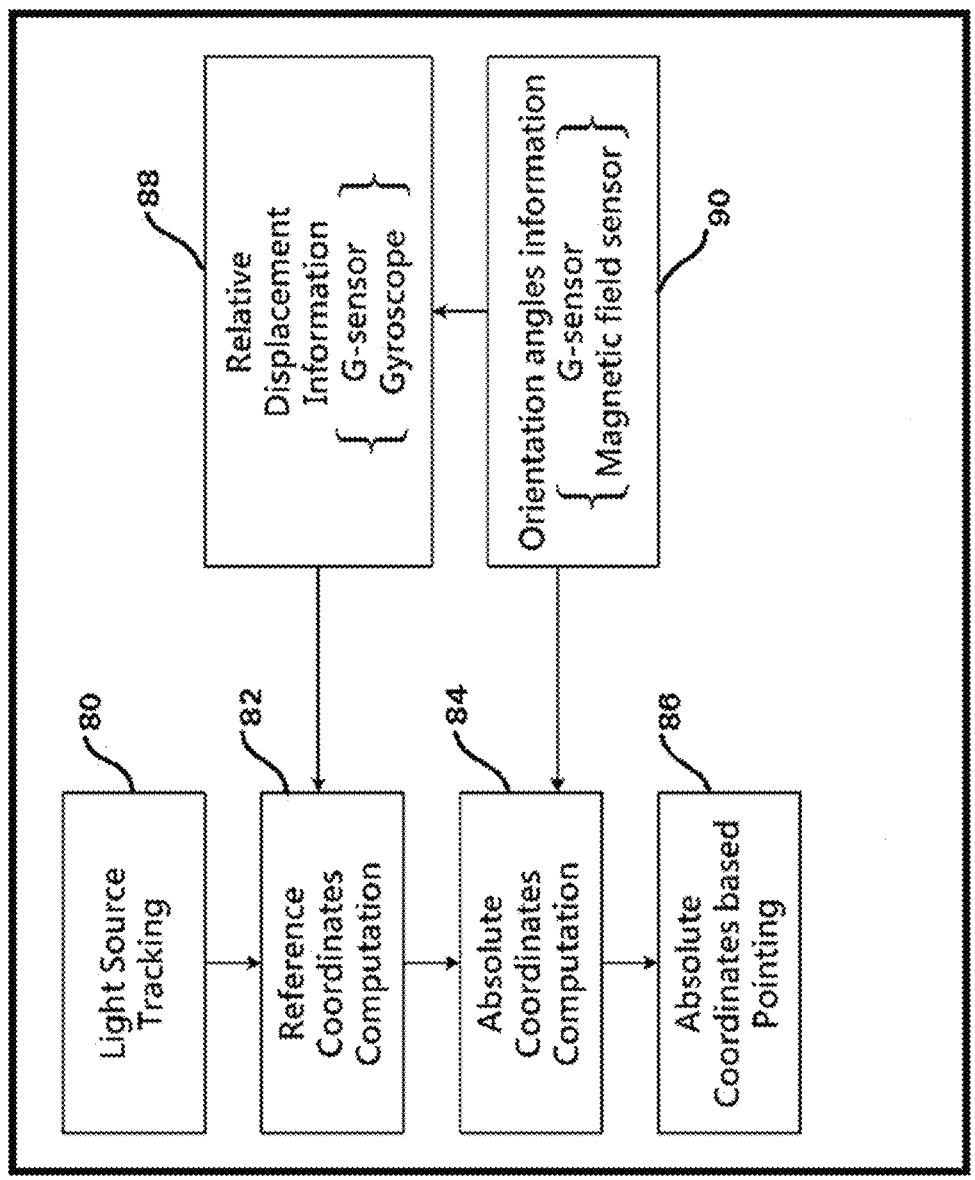
FIG. 8 shows in flow chart form computations according to the present disclosure for direct three-dimensional pointing using a single imaging device associated with a display surface.

The computation process of the computing device 56 processor is shown in flow chart form in FIG. 8. Here, for ease of explanation, we assume the imaging device 54 is installed at the center of the image display apparatus 52 with its focal point 72 aligned with the screen of the image display apparatus 52. However, alternative configurations are contemplated as will be discussed further below. A right-handed coordinate system is defined for the scene, with the origin of the coordinate system set at the center point of the image display apparatus 52 which is also the focal point of the image capture device 54 The x-axis is a horizontal line in the image display apparatus 52 that passes through the center point, and the y-axis is a vertical line in the image display apparatus 52 that passes the center point. All subsequent figures are projections of the scene on the xz-plane which is parallel to the floor of the room. In the following discussion, we explain the computation process in detail.

In Step 80, the computing device 56 processor identifies the region corresponding to the light source in the image taken at time $t_{k+1}$ (see FIG. 9) by the image capture device 54. The identification process is carried out using light tracking techniques and associated software. One suitable light tracking technique is disclosed in the present Assignee's U.S. patent application Ser. No. 14/089,881 for "Algorithms, Software, and an Interaction System that Support the Operation of an On the Fly Mouse," the entirety of its disclosure of which is incorporated herein by reference.

Figure 9:
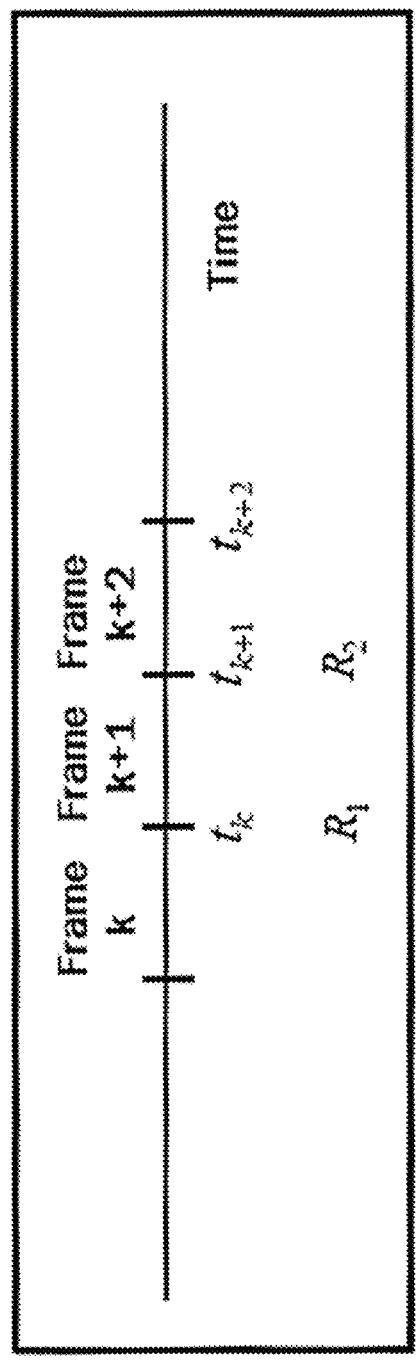
FIG. 9 illustrates obtaining image frames over a time sequence of $t_k$, $t_{k+1}$, $t_{k+2}$.
Figure 10:
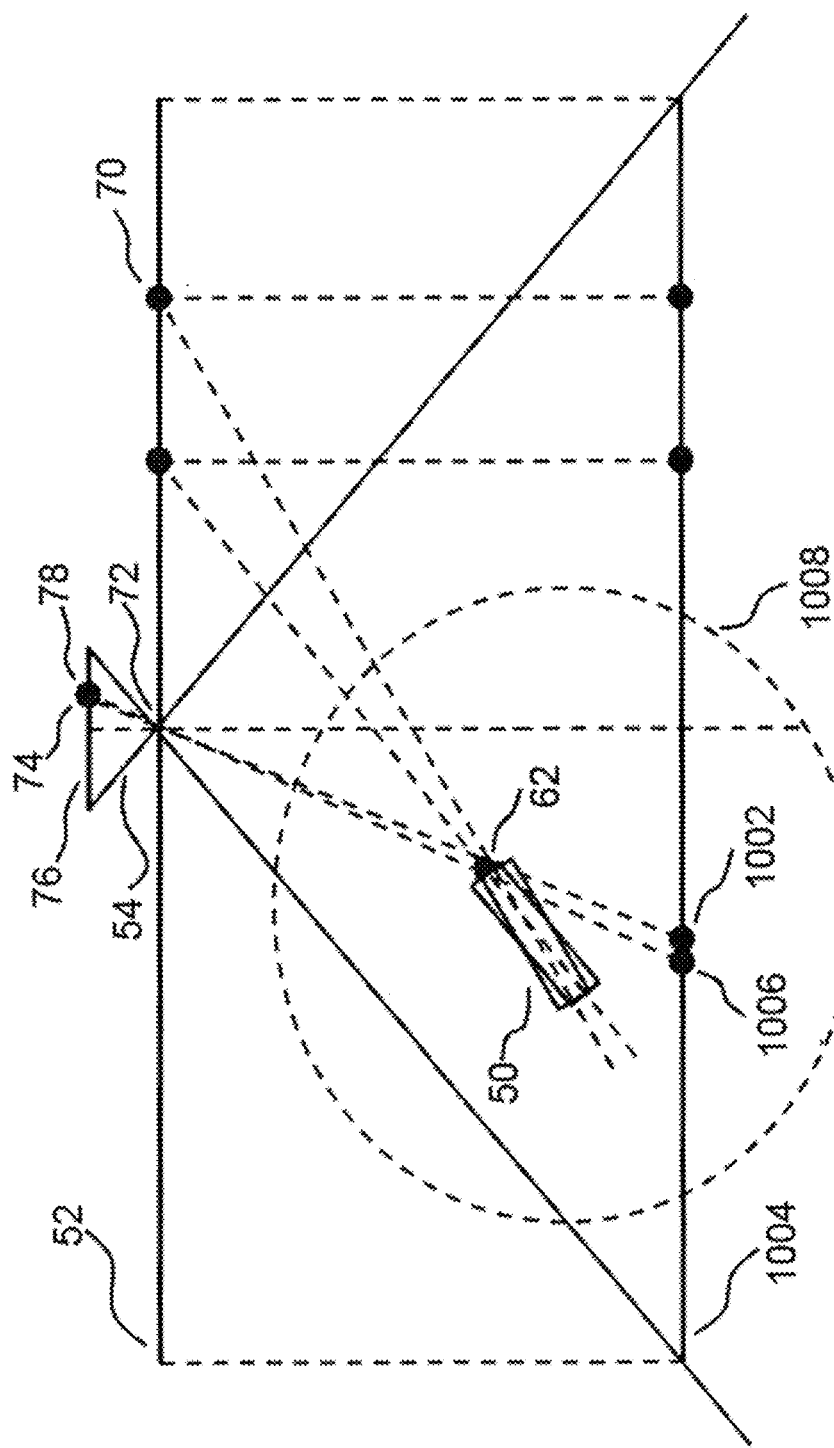
FIG. 10 illustrates computation of a displayed point on a display surface according to FIG. 7 in greater detail.

The center of the region will be denoted 74 in the image recording portion 76 (such as a CCD) of the image capture device 54 (see FIG. 7 and FIG. 10). That point 74 is then mapped to a point 102 on a virtual image plane 1004 of the same dimension as the image display apparatus 52 through the focal point 72 of the image capture device 54 (see FIG. 10). At this time we assume the same process has been performed for the image taken at time $t_k$ (see FIG. 9), that is, the center point of the region corresponding to the light source in the image taken at time $t_k$ was identified, denoted 78, and mapped to a point 1006 in the virtual image plane 1004 through the focal point 72 (see FIG. 10). If the point 74 is the same as the point 78, we repeat the process for the subsequent captured frames until we reach a time $t_{k+i+1}$ for some i>0 such that the points we obtained for $t_{k+i}$ and $t_{k+i+1}$ are different. For simplicity of notation, these points will also be denoted 74 and 78. Note that in FIGS. 10, 74 and 78 represent different points even though they seem to coincide at the same point.

Figure 11:
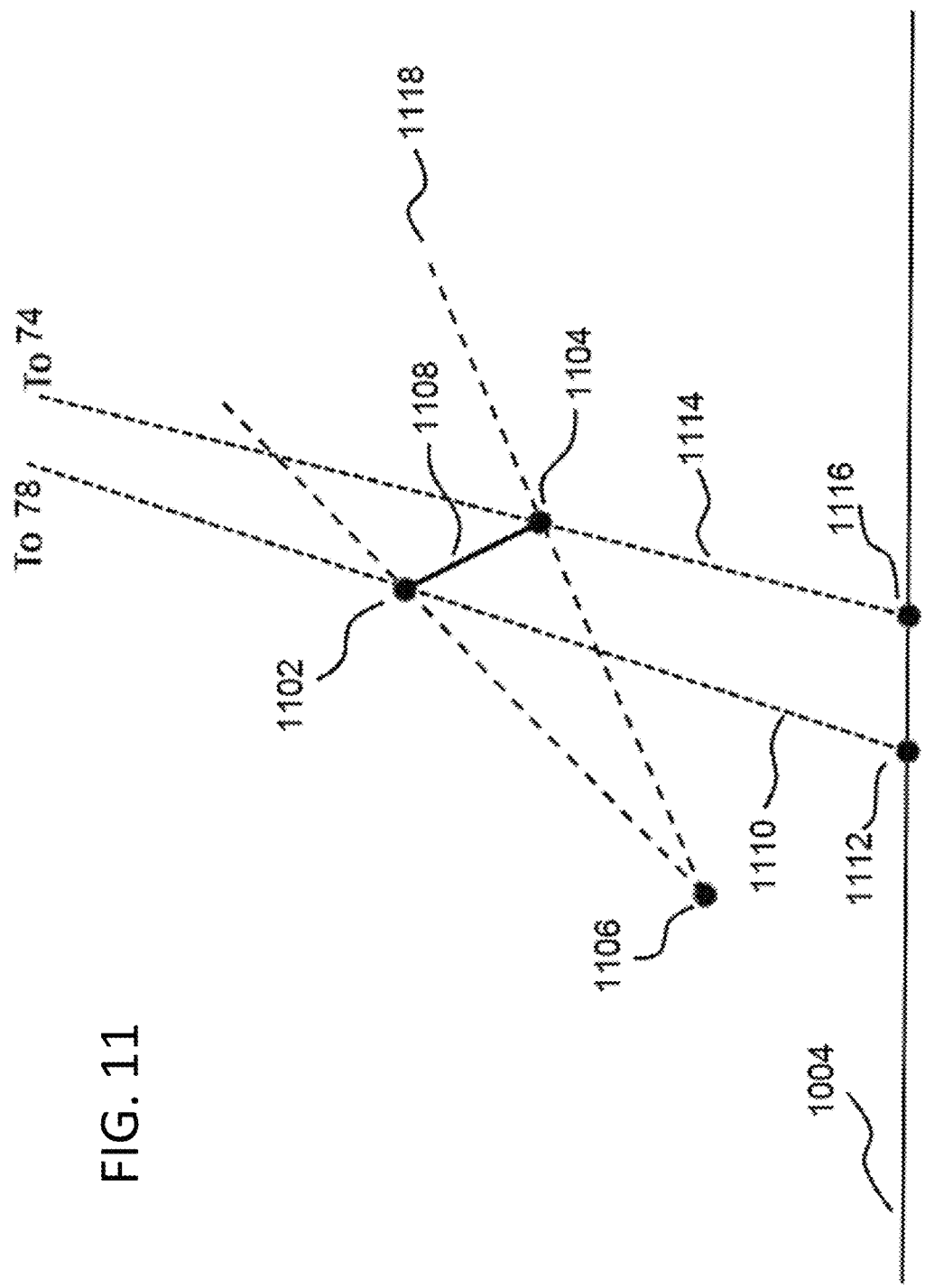
FIG. 11 illustrates in isolation computation of a displacement vector of a pointing/input device shown in FIG. 10.

In Step 82, the computing device 56 processor computes the location of the light source 62 in 3D space using information obtained from Steps 88 and 90. Since the operator 0 can move and rotate the pointing device 50, the light source 62 experiences both translation and spinning. Steps 88 and 90 provide a displacement vector of the light source 62 between $t_k$ and $t_{k+1}$ (or, $t_{k+i}$ and $t_{k+i+1}$ for some i>0. However, for simplicity, we shall assume i=0 here) to Step 82. To make illustration easier, we enlarge the portion of FIG. 10 that is inside the dotted circle 1008 and show the enlarged portion in FIG. 11. In FIG. 11, the points 1102 and 1104 represent the locations of the light source 62 at $t_k$ and $t_{k+1}$, respectively, and the point 1106 represents the spin pivot of the pointing device 50 at $t_{k+1}$. The displacement vector of the light source 62 between $t_k$ and $t_{k+1}$, denoted $\vec{V}$1108, is the vector between point 1102 and point 1104. If we know $\vec{V}$ 1108, then we can compute 1102 and 1104 as follows: find a point A on the line 1110 defined by the image point 74 and the point 1112 on the virtual image plane 1004, and find a point B on the line 1114 defined by the image point 74 and the point 1116 on the virtual image plane 1004 (see FIG. 10 or FIG. 11) so that $$B - A = \vec{V}$$

Since the parametric representations of 1110 and 1114 are known, finding A and B is a straightforward process, and 1102 is A and 1104 is B. So, the task here is to find $\vec{V}$1108. This process is discussed below.

If we use r(t) to represent the location of the light source 62 on an image at time t, then the displacement vector $\vec{V}$ can be expressed as $$\vec{V} = r(t_{k+1}) - r(t_k) = \frac{1}{2}(\dot{r}(t_{k+1}) + \dot{r}(t_k))\Delta t_k$$

where $\dot{r}(t)$ stands for the velocity of the LED at time t and $\Delta t_k \equiv t_{k+1} - t_k$. However, since a device held by hand does not have inertia, one can ignore $\dot{r}(t_k)$ in the above equation, simply use the following equation to compute V:

$$\vec{V} = \dot{r}(t_{k+1}) * \Delta t_k \qquad (1)$$

Since the pointing/input device 50 experiences both translation and spin, $\dot{r}(t)$ can be expressed as $$\dot{r}(t) = \omega(t) \times (r(t) - x(t)) + v(t) \qquad (2)$$

where $\omega(t)$ is the angular velocity of r(t) at time t, x(t) is the spin pivot of r(t) at time t, x is the cross-product notation, and v(t) is the linear velocity of r(t) at time t. Theoretically, the value of v(t) at $t_{k+1}$ is computed as follows:

$$v(t_{k+1}) = V(t_k) + a(t_{k+1}) * \Delta t_k \qquad (3)$$

where a $(t_{k+1})$ is the linear acceleration of r(t) at $t_{k+1}$. Again, since a hand-held device does not have inertia, one can ignore the term $v(t_k)$ in equation (3), simply use the following equation to compute $v(t_{k+1})$:

$$v(t_{k+1}) = a(t_{k+1}) * \Delta t_k \qquad (4)$$

Therefore, from equations (1), (2), and (4), we have the following equation for $\vec{V}$:

$$\vec{V} = \omega(t_{k+1}) \times (r(t_{k+1}) - x(t_{k+1})) * \Delta t_k + a(t_{k+1}) * (\Delta t_k)^2 \qquad (5)$$

The values of $\omega(t_{k+1})$ and $a(t_{k+1})$ can be obtained respectively from the Gyroscope sensor and the G-sensor of the motion sensor module 66. On the other hand, $r(t_{k+1}) - x(t_{k+1})$ is nothing but $D_2$ (direction of the pointing device 2 at $t_{k+1}$, to be defined below) times L, the distance between 1104 and 1106 in FIG. 11:

$$r(t_{k+1}) - x(t_{k+1}) = L * D_2 \qquad (6)$$

Hence, by substituting (6) into (5), we have the following formula for $\vec{V}$1108:

$$\vec{V} = L * (\omega(t_{k+1}) \times D_2) * \Delta t_k + a(t_{k+1}) * (\Delta t_k)^2 \qquad (7)$$

To define $D_2$, let $N = (x_N, 0, z_N)$ be a vector in the direction of north with unit length, i. e., $$\sqrt{(x_N)^2 + (z_N)^2} = 1$$

Figure 12:
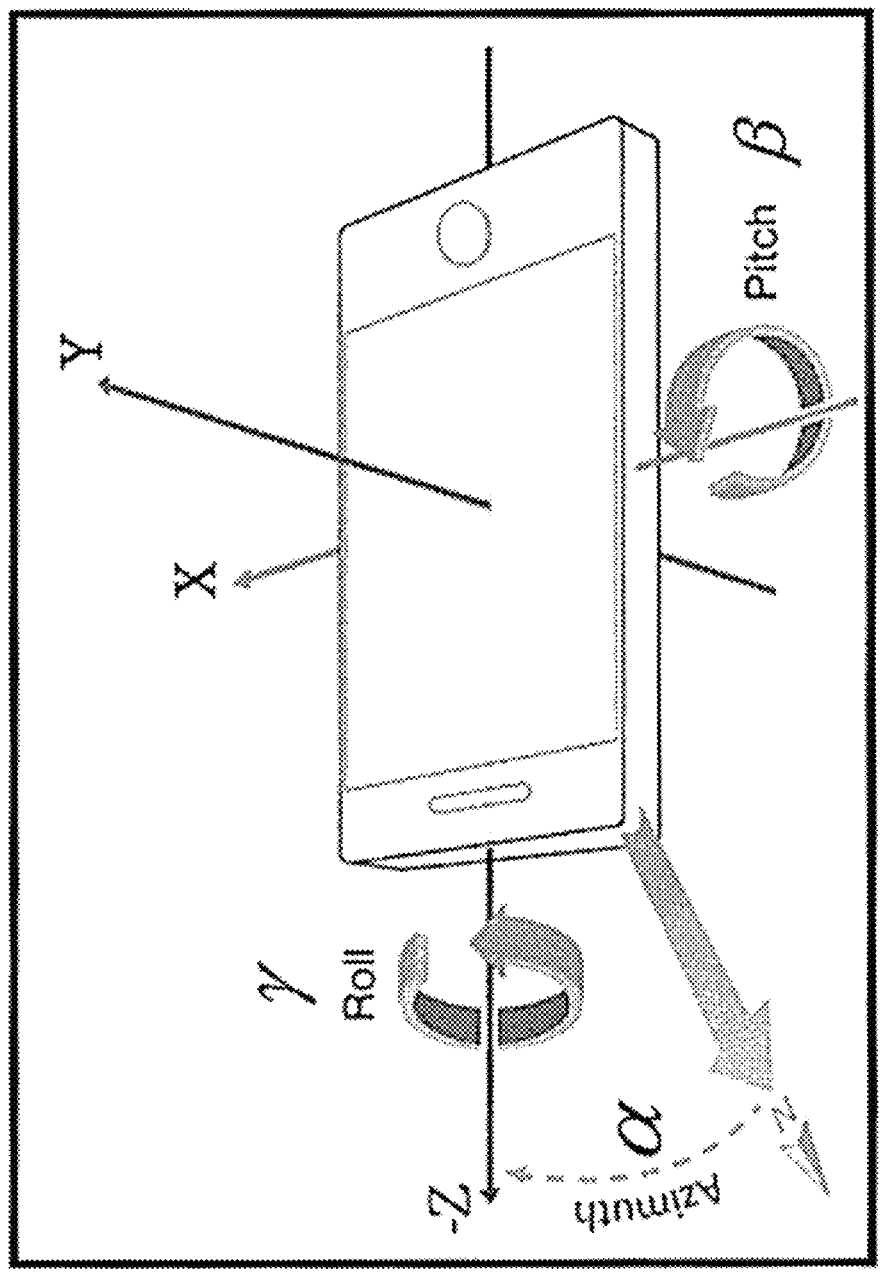
FIG. 12 illustrates data obtained by a motion sensor module of a pointing/input device according to the present disclosure.

Let the azimuth, pitch and roll angles provided by the sensors of the motion sensor module 66 of the pointing/input device 50 at $t_{k+1}$ be α, β, and γ, respectively (see FIG. 12).

The azimuth is a clockwise rotation of a about the y-axis. The rotation matrix is given by $$R_y(\alpha) = \begin{bmatrix} \cos\alpha & 0 & -\sin\alpha \\ 0 & 1 & 0 \\ \sin\alpha & 0 & \cos\alpha \end{bmatrix}$$

The pitch is a clockwise rotation of β about the x-axis. The rotation matrix is given by $$R_x(\beta) = \begin{bmatrix} 1 & 0 & 0 \\ 0 & \cos\beta & \sin\beta \\ 0 & -\sin\beta & \cos\beta \end{bmatrix}$$

The roll is a clockwise rotation of γ about the z-axis. The rotation matrix is given by $$R_z(\gamma) = \begin{bmatrix} \cos\gamma & \sin\gamma & 0 \\ -\sin\gamma & \cos\gamma & 0 \\ 0 & 0 & 1 \end{bmatrix}$$

By multiplying these three matrices up, we get a single rotation matrix $$R(\gamma, \beta, \alpha) = R_z(\gamma)R_x(\beta)R_y(\alpha) = \quad (8)$$

$$\begin{bmatrix} \cos\alpha\cos\gamma + \sin\alpha\sin\beta\sin\gamma & \cos\beta\sin\gamma & -\sin\alpha\cos\gamma + \cos\alpha\sin\beta\sin\gamma \\ -\cos\alpha\sin\gamma + \sin\alpha\sin\beta\cos\gamma & \cos\beta\cos\gamma & \sin\alpha\sin\gamma + \cos\alpha\sin\beta\cos\gamma \\ \sin\alpha\cos\beta & -\sin\beta & \cos\alpha\cos\beta \end{bmatrix}$$

To find the direction $D_2$ of the pointing/input device 50 at $t_{k+i}$, simply multiply the unit vector N by the rotation matrix $R(\gamma,\beta,\alpha)$:

$$D_2 = (\gamma,\beta,\alpha)N \quad (9)$$

In Step 84, the computing device 56 processor computes the intersection point 70 of the axis of the pointing/input device 50 with the image display apparatus 52 at time $t_{k+1}$ (see FIG. 9). The location of the intersection point 70 is where the operator O wants a cursor to be shown on the image display apparatus 52. The axis of the pointing/input device 50, denoted 1118, can be expressed as $$L(u)=B+t*D_2, t\in R \quad (10)$$

where B 1104 is the location of the LED light source 62 and $D_2$ is the pointed direction of the pointing/input device 50 at $t_{k+i}$ (see FIG. 11). B is available from Step 88 and $D_2$ is available from Step 90 (see FIG. 8). Hence, to find the point 70, simply find the intersection point of L(t) defined in equation (10) with the plane z=0.

In Step 86, the computing device 56 processor sends instructions to show a cursor at the point computed in Step 84 or move the cursor from its previous location to the new location computed in Step 84. The computing device 56 processor will also perform required actions to accommodate interactions specified by the operator O through keys or buttons of the control panel 64 of the pointing/input device 50.

Of course, the computing device 56 repeats the above steps for each new image sent by the image capture device.

Figure 13:
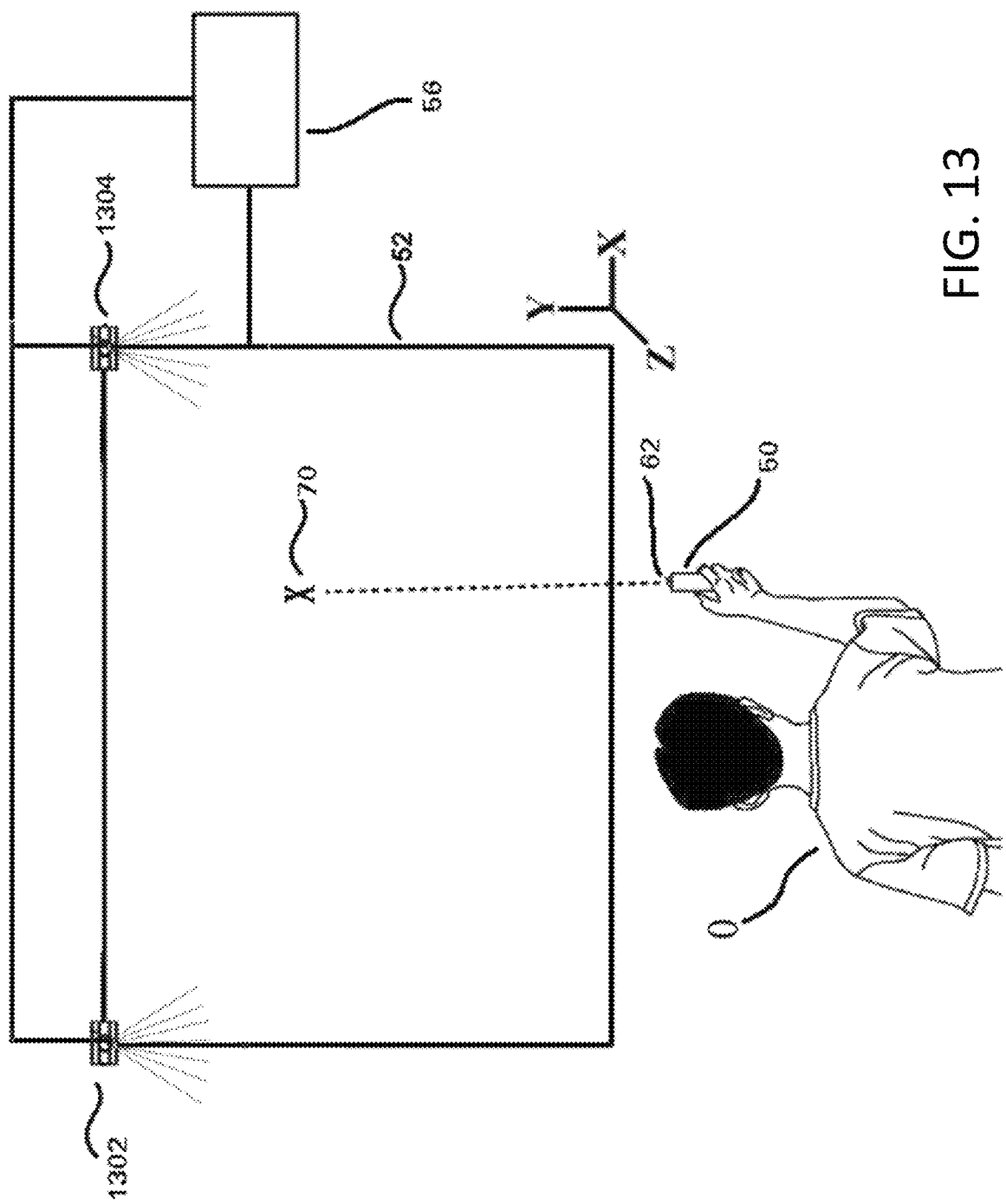
FIG. 13 shows a system for three-dimensional pointing and command input according to the present disclosure, including a pointing/input device and a display surface including two imaging devices.

The foregoing discussion describes a system comprising a single imaging device 54, but multiple imaging devices may be incorporated into the presently disclosed system. In one embodiment as shown in FIG. 13, a pointing system is provided including two imaging devices 1302 and 1304, installed at the upper left corner and the upper right corner of the display surface 52, respectively. The computation process for the computing device 56 processor in this case is shown schematically in FIG. 14, and is explained in detail in the discussion that follows.

Figure 15:
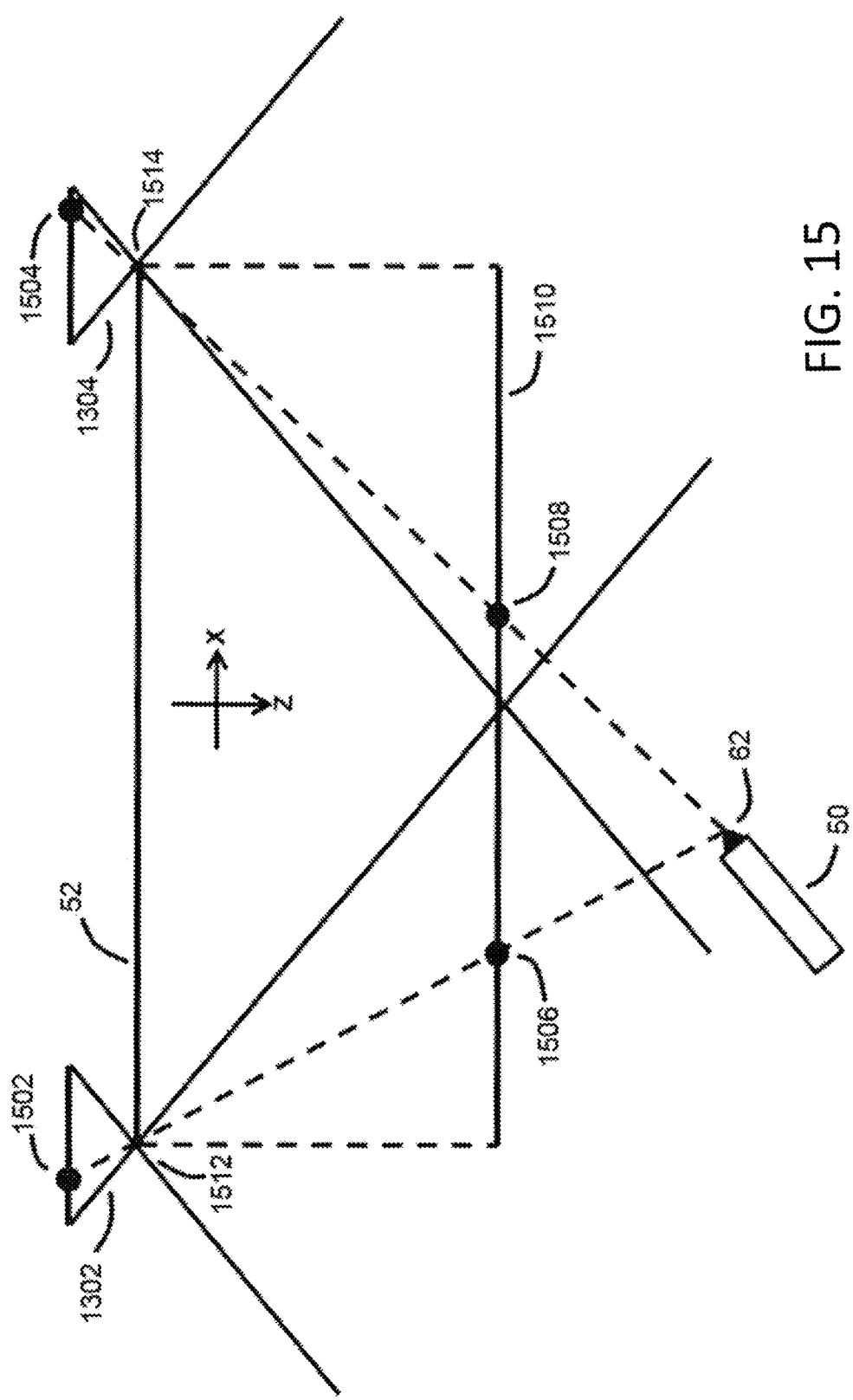
FIG. 15 illustrates computation of a displayed point on a display surface using the system of FIG. 13.

In Step 1402, the work is similar to Step 80 in FIG. 8 except the work now has to be performed for both imaging devices 1302, 1304. For the images taken by the imaging devices 1302, 1304 at time $t_k$, the computing device 56 processor identifies (in captured image frames) the regions corresponding to the light source 62 in these images. The centers of these regions will be denoted 1502 and 1504, respectively (see FIG. 15). Centers 1502 and 1504 are then mapped to points 1506 and 1508 on the virtual image plane 1510 through the focal points 1512 and 1514, respectively (see FIG. 15).

In Step 1404 (FIG. 14), a standard triangulation method is used to find the location of the light source 62 in 3D space. The triangulation method will find the intersection point of the ray through 1502 and 1512 (or through 1512 and 1506) and the ray through 1504 and 1514 (or, through 1514 and 1508). This intersection point is the location of the light source 62 in 3D space. A suitable method for triangulation is provided in Hartley et al., 1997, "Triangulation," Computer Vision and Image Understanding, Vol. 68, No. 2, pp 146-157, although other triangulation methods may be suitable and are contemplated for use herein.

Figure 14:
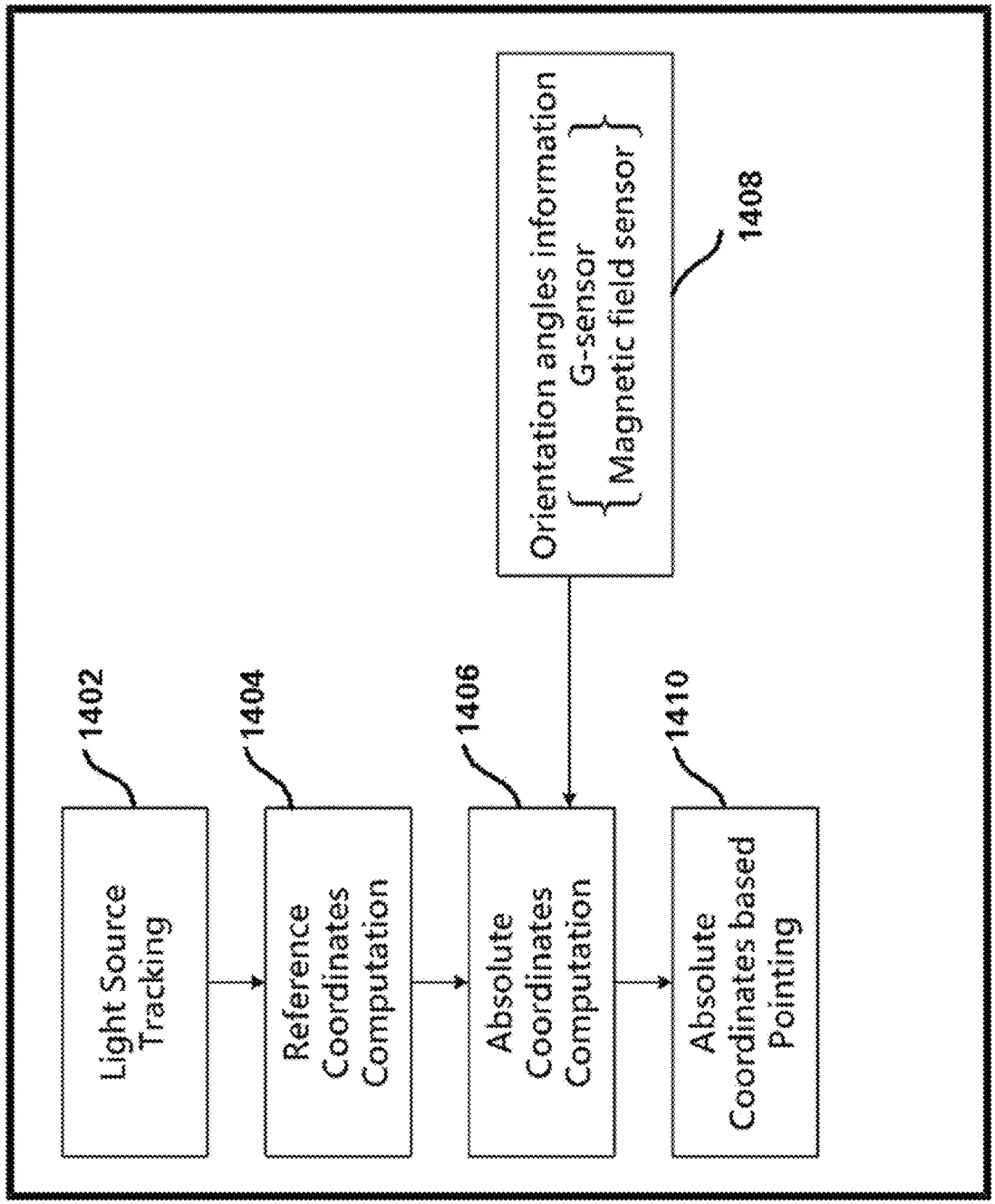
FIG. 14 shows in flow chart form computations according to the present disclosure for direct three-dimensional pointing using the system of FIG. 13.

Once the location of the light source in 3D space is known, the remaining steps depicted in FIG. 14 are the same as the corresponding steps in FIG. 8, i.e., Step 1406 will use the information provided by Step 1408 to compute the direction $D_2$ of the pointing device 50 defined in eq. (9), and then use the 3D location of the light source and the direction of the pointing device 50 to find an intersection point of the axis of the pointing device 50 with the display surface 52 of the image display apparatus at time $t_k$. This intersection point is the location of the aimed point of the pointing device 50.

Summarizing, the present disclosure provides robust methods and systems for three-dimensional pointing using light tracking and relative position detection techniques. Advantageously, the disclosed methods and systems are likewise economical, simple, and likely already available in many homes but for the pointing/input device 50 and software. But for the pointing/input device 50 and software, for additional hardware the system 10 requires only a computing device 56 and conventional imaging devices 54 such as standard webcams, and has no requirement for any specific wired or wireless connection (such as wiring or cabling, or a specialized IR or other signal) between the pointing/input device 50 and the imaging device 54. Exemplary advantages of the disclosed system include allowing an operator to point and/or input gesture commands to a computing device, a "smart" television, and the like in 3D mode.

One of ordinary skill in the art will recognize that additional embodiments of the invention are also possible without departing from the teachings herein. Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A computing system for direct three-dimensional pointing and command input, comprising:
   at least one computing device having at least one processor, at least one memory, and at least one graphical user interface;
   a pointing/input device including at least one light source and a motion sensor module providing information regarding an absolute and a relative displacement of the pointing/input device to the at least one computing device;
   at least one imaging device operably linked to the computing device processor and configured for capturing a plurality of sequential image frames each including a view of the at least one light source as the pointing/input device is held and/or moved in a three-dimensional space and within a field of view of the at least one imaging device; and
   at least one non-transitory computer program product operable on the computing device processor;
   wherein the at least one computer program product includes executable instructions for calculating at least a position and/or a motion of the at least one light source in three-dimensional space from the plurality of captured sequential image frames and from the pointing/input device absolute and relative displacement information, and for rendering on the graphical user interface a visual indicator corresponding to the calculated position and/or the motion of the at least one light source;
   further wherein the step of calculating at least a position and/or a motion of the at least one light source in three-dimensional space compares image frame data defining a location of the at least one light source in at least two sequential captured image frames of the plurality of captured image frames.

2. The system of claim 1, including at least two imaging devices.

3. The system of claim 1, wherein the at least one computer program product includes executable instructions for determining a position and/or a motion of the at least one light source in three-dimensional space by the steps of:
   determining a current position of the at least one light source in a captured image frame;
   determining a prior position of the at least one light source in at least one prior captured sequential image frame;
   determining a relative displacement of the pointing/input device from information provided by the motion sensor module;
   calculating a location of the at least one light source in three-dimensional space from the determined relative displacement information and the determined at least one light source current and prior positions;
   determining a pointing direction of the pointing/input device defining an axis of the pointing/input device from information provided by the motion sensor module; and
   from the calculated three-dimensional location of the at least one visible light source and the determined pointing direction of the pointing/input device provided by the motion sensor module, calculating an intersection point of the axis of the pointing/input device and the graphical user interface.

4. The system of claim 3, wherein the at least one computer program product includes executable instructions for displaying the calculated intersection point as a visual indicator in the graphical user interface.

5. The system of claim 3, wherein the at least one computer program product includes executable instructions for calculating a location of the at least one light source in three-dimensional space from the determined current and prior positions of the at least one light source by:
   identifying a first region corresponding to a position of the at least one light source in the captured image frame and a second region corresponding to a position of the at least one light source in the at least one prior captured image frame;
   from said identified first region and second region, calculating a first position of the at least one light source in the captured image frame and a second position of the at least one light source in the at least one prior captured image frame; and
   from said first and second positions, calculating a displacement vector of the pointing/input device caused by translating the at least one light source between the first region and the second region.

6. The system of claim 5, wherein the at least one computer program product includes executable instructions for, in succeeding sets of current and prior captured image frames, iteratively repeating the steps of identifying first and second locations, calculating first and second positions, and calculating a displacement vector.

7. The system of claim 1, wherein the at least one imaging device has a frame capture rate of at least 30 frames per second.

8. In a computing system environment, a method for tracking a pointing/input device, comprising:
   holding and/or moving a pointing/input device including at least one light source and a motion sensor module in a three-dimensional space disposed within a field of view of at least one imaging device operably connected to a computing device having at least one processor, at least one memory, and at least one graphical user interface;
   by the at least one imaging device, capturing a plurality of sequential image frames each including a view of a position of the at least one light source within the imaging device field of view;
   from the motion sensor module, obtaining absolute and relative displacement information of the at least one pointing/input device;
   by the at least one processor, calculating at least a position and/or a motion of the at least one light source in three-dimensional space from compared image frame data defining said position of the at least one light source in at least two image frames of the plurality of captured sequential image frames and said absolute and relative displacement information; and rendering a visual indicator on the at least one graphical user interface corresponding to the position and/or motion of the at least one point light source.

9. The method of claim 8, further including interpreting the position and/or motion of the at least one light source as a predetermined pointing and/or input command.

10. The method of claim 8, wherein the position and/or motion of the at least one light source in three-dimensional space is calculated by:
   determining a current position of the at least one light source in a captured image frame;
   determining a prior position of the at least one light source in at least one prior captured image frame;
   determining a relative displacement of the pointing/input device from information provided by the motion sensor module;
   calculating a location of the at least one light source in three-dimensional space from the determined relative displacement information and the determined at least one light source current and prior positions;
   determining a pointing direction of the pointing/input device defining an axis of the pointing/input device from information provided by the motion sensor module; and
   from the calculated three-dimensional location of the at least one light source and the determined pointing direction of the pointing/input device provided by the motion sensor module, calculating an intersection point of the axis of the pointing/input device and the graphical user interface.

11. The method of claim 10, including displaying the calculated intersection point as a visual indicator in the graphical user interface.

12. The method of claim 10, wherein the location of the at least one light source in three-dimensional space is calculated by:
   identifying a first region corresponding to a position of the at least one light source in the captured image frame and a second region corresponding to a position of the at least one light source in the at least one prior captured image frame;
   from said identified first region and second region, calculating a first position of the at least one light source in the captured image frame and a second position of the at least one light source in the at least one prior captured image frame; and
   from said first and second positions, calculating a displacement vector of the pointing/input device caused by translating the at least one light source between the first region and the second region.

13. The method of claim 12, further including the steps of: in succeeding sets of current and prior captured image frames, iteratively repeating the steps of identifying first and second locations, calculating first and second positions, and calculating a displacement vector.

14. A computing system for direct three-dimensional pointing and command input, comprising:
   at least one computing device having at least one processor, at least one memory, and at least one graphical user interface;
   a pointing/input device including at least one light source and a motion sensor module providing information regarding an absolute and a relative displacement of the pointing/input device to the at least one processor;
   first and second imaging devices operably linked to the computing device processor and configured for capturing a plurality of sequential image frames each including a view of the at least one light source as the pointing/input device is held and/or moved in a three-dimensional space and within a field of view of the first and second imaging devices; and
   at least one non-transitory computer program product operable on the computing device processor;
   wherein the at least one computer program product includes executable instructions for calculating at least a position and/or a motion of the at least one light source in three-dimensional space from the plurality of captured sequential image frames and from the pointing/input device absolute and relative displacement information, and for rendering on the graphical user interface a visual indicator corresponding to the calculated position and/or the motion of the at least one light source;
   further wherein the step of calculating at least a position and/or a motion of the at least one light source in three-dimensional space compares image frame data defining a location of the at least one light source in at least two sequential captured image frames of the plurality of captured sequential image frames.

15. The system of claim 14, wherein the at least one computer program product determines a position and/or a motion of the at least one light source in three-dimensional space by the steps of:
   determining a current position of the at least one light source in corresponding current captured image frames captured by the first and second imaging devices;
   determining a prior position of the at least one light source in at least one corresponding prior captured image frame captured by the first and second imaging devices;
   from the determined current and at least one prior position of the at least one light source in the corresponding current and prior captured image frames, calculating a location in three-dimensional space of the at least one light source by triangulation;
   determining a pointing direction of the pointing/input device defining an axis of the pointing/input device from information provided by the motion sensor module; and
   from the calculated three-dimensional location of the at least one visible light source and the determined pointing direction of the pointing/input device provided by the motion sensor module, calculating an intersection point of the axis of the pointing/input device and the graphical user interface.

16. The system of claim 15, wherein the at least one computer program product includes executable instructions for displaying the calculated intersection point as a visual indicator in the graphical user interface.

17. The system of claim 15, wherein the at least one computer program product includes executable instructions for calculating a location of the at least one light source in three-dimensional space from the determined current and prior positions of the at least one light source by:
   identifying a first region corresponding to a position of the at least one light source in the corresponding current captured image frames and a second region corresponding to a position of the at least one light source in the at least one prior corresponding captured image frames;
   from said identified first region and second region, calculating a first position of the at least one light source in the corresponding current captured image frames and a second position of the at least one light source in the at least one prior corresponding captured image frames; and calculating a location of the at least one light source in three-dimensional space by a triangulation method.

18. The system of claim 15, wherein the first and second imaging devices each have a frame capture rate of at least 30 frames per second.

\* \* \* \* \*